United States Patent
Putter

[15] 3,699,158
[45] Oct. 17, 1972

[54] SELECTIVE DEUTERATION OF TYROSINE, ASPARTIC AND GLUTAMIC ACIDS

[72] Inventor: Irving Putter, Martinsville, N.J.

[73] Assignee: Merck & Co., Inc., Rahway, N.J.

[22] Filed: Aug. 25, 1969

[21] Appl. No.: 852,926

[52] U.S. Cl............260/519, 260/534 E, 260/534 G
[51] Int. Cl..............................................C07c 101/04
[58] Field of Search...............260/519, 534 E, 534 G

[56] References Cited

OTHER PUBLICATIONS

Remy, H., Treatise on Inorganic Chemistry, Vol. II, (1956), pub. by Elsevier Pub. Co., New York, pp. 558 and 559 relied on.

*Primary Examiner*—Lorraine A. Weinberger
*Assistant Examiner*—L. Arnold Thaxton
*Attorney*—Joseph W. Molasky, J. Jerome Behan and I. Louis Wolk

[57] ABSTRACT

A method for the preparation of deuterated L-tyrosine, L-aspartic acid and L-glutamic acid which comprises treating protonated L-tyrosine, L-aspartic acid or L-glutamic acid or a suitable partially deuterated analog thereof with either a deuterated inorganic acid or an alkali metal deuteroxide or alkaline earth metal deuteroxide. The products thus obtained are useful as intermediates in the preparation and study of labelled peptides, polypeptides and proteins and as a growth medium for biological investigations.

25 Claims, No Drawings

SELECTIVE DEUTERATION OF TYROSINE, ASPARTIC AND GLUTAMIC ACIDS

This invention relates to a novel class of deuterated products selected from deuterated L-tyrosine, L-aspartic acid and L-glutamic acid and to a novel method for their preparation. Specifically, the novel deuterated L-tyrosine, L-aspartic acid and L-glutamic acid products of this invention are compounds having the following general formulae

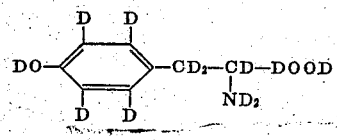

and $$DOOC-C(R)_2-(CRR)_n-CR-COOD$$
$$\phantom{DOOC-C(R)_2-(CRR)_n-CR-C}|$$
$$\phantom{DOOC-C(R)_2-(CRR)_n-CR-}ND_2$$

wherein R is hydrogen or deuterium and *n* is an integer having a value of 0 or 1.

The products of this invention are useful in preparing synthetically labelled peptides and in fermentation processes in affording labelled proteins. In addition, the instant products have utility as a growth medium in the preparation of *Staphylococcus Aureus* bacteria from which there can be isolated a deuterated staphylococcal nuclease, which enzyme is useful in the study of the mechanism of the action of an enzyme on its substrate by nuclear magnetic resonance spectroscopy.

According to the process of this invention the nuclear carbons ortho to the hydroxy radical in L-tyrosine, the beta carbon in L-aspartic acid and the gamma carbon in L-glutamic acid are selectively deuterated via the reaction of L-tyrosine, L-aspartic acid or L-glutamic acid with a deuterated inorganic acid as, for example, with a deuterated mineral acid such as deuterium chloride or deuterium bromide or deuterium sulfate, i.e., $D_2SO_4$, or, with a deuterated metal hydroxide such as an alkali metal deuteroxide or alkaline earth metal deuteroxide as, for example, with sodium deuteroxide, potassium deuteroxide, calcium deuteroxide or magnesium deuteroxide and the like. The concentration of the deuterated inorganic acid and deutroxide are not particularly critical but, in practice, it is most desirable to employ the deuterated inorganic acid in a concentration of from about 1 N to about 7 N, and to employ the deuteroxide in a concentration of from about 0.1 N to about 1.0 N. The application of heat serves to catalyze the synthesis and, therefore, in general, it is also desirable to conduct the process at the reflux temperature of the reaction mixture or at temperatures in the range of from about 80°–120° C., usually over an extended period of from about one hour to several days. The L-tyrosine, L-aspartic acid and L-glutamic acid starting materials of the instant process may be employed in either their protonated form to afford the partially deuterated products described infra as I and Ia, or, if a completely deuterated product is desired, the latter may be obtained by simply employing the appropriate partially deuterated precursor (II and III, infra). This invention is illustrated by the following equations in which A and B depict the formation of partially deuterated L-tyrosine, L-aspartic acid and L-glutamic acid and equations C and D illustrate the formation of the corresponding completely deuterated analogs (Ib and Ic, infra). The deuterium reagent described in the following equations is deuterium chloride, however, this is for illustration only and it should be understood that all of the deuterated inorganic acids and alkali metal deuteroxides and alkaline earth metal deuteroxides mentioned above may be substituted therefor in an otherwise analogous process to afford an identical product:

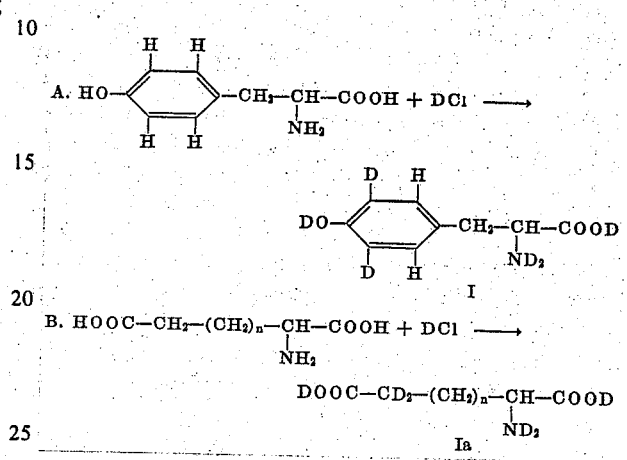

wherein *n* is an integer having a value of 0 or 1. The following equations illustrate the preparation of completely deuterated products according to this invention via the deuteration of their corresponding partially deuterated precursors:

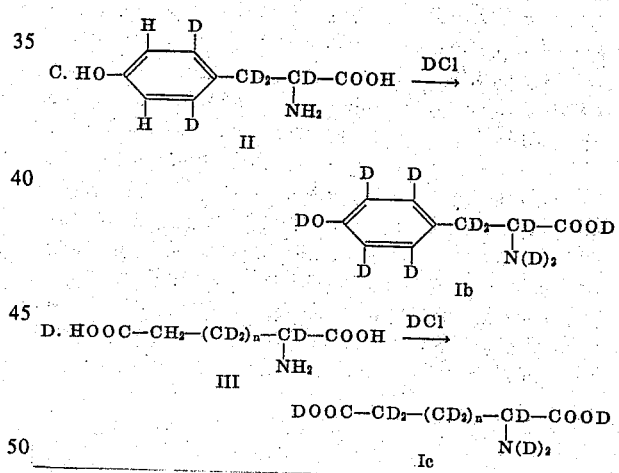

wherein *n* is as defined above. It will be noted in respect of the foregoing equations C and D that complete deuteration is effected in essentially the same manner as is the deuteration synthesis illustrated by equations A and B because it is the hydrogen atoms bonded to the ortho-carbon in tyrosine and the hydrogen atoms bonded to the beta- and gamma- carbons in aspartic acid and glutamic acid, respectively, which are replaced by deuterium.

It has also been found that the totally deuterated L-aspartic acid and L-glutamic acid products (Ic) obtained via the foregoing method can be converted to their partially deuterated derivatives (Id, infra) by simply heating the former at a temperature in the range of from about 90° to 150° C. and preferably at 110° to 120° C. over a period of from about 6 to 100 hours with a concentrated solution of an acid followed by lyophilization of the resulting partially deuterated intermediate (III, infra) from deuterium oxide to effect an exchange of deuterium for the hydrogen atoms bonded to the amino and carbonyloxy moieties. Suitable acids which may be employed in the process include, for example, the mineral acids such as hydrochloric acid, hydrobromic acid, sulfuric acid and the like in concentrations of from about 1 N to 7 N, but, preferably, at a concentration of about 6 N. The following equation illustrates this method of preparation:

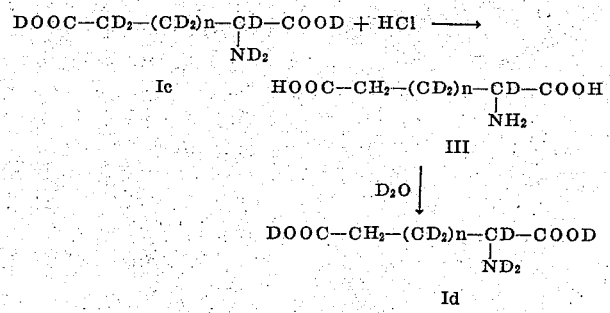

wherein $n$ is as defined above.

The partially deuterated L-tyrosine, L-aspartic acid and L-glutamic acid starting materials (II and III) of the instant process are obtained via a multi-step synthesis which comprises subjecting deuterated algae to a series of hydrolysis, concentration, filtration, adsorption and isolation steps. According to this procedure lyophilized deuterated algae is treated with a a suitable acid as, for example, with a trihaloacetic acid such as trifluoroacetic acid or trichloroacetic acid at a concentration of from about 30° C. to 80° C. or with dilute mineral acid as, for example, with a 0.1 N to 2.0 N solution of hydrochloric acid or sulfuric acid and the like at a temperature in the range of from about 50° C. to 90° C. for a period of from about 15 minutes to 24 hours, thereby causing the proteins and chlorophyll to separate from the cells in an insoluble form while solubilizing certain undesirable components of the algae, such as sugars. The insoluble residue obtained by centrifugation contains the liberated proteins, chlorophyll and lipids. By subjecting this residue to a few washes with an ethanol-ethyl ether mixture whereby the chlorophyll and lipids are solubilized, the residue containing the liberated protein is obtained. The L-amino acids thus obtained are then liberated from the protein residue by hydrolysis with an acid as, for example, with a mineral acid such as hydrochloric acid; humin and insoluble polymeric material are precipitated and the acid is removed from the filtrate to provide a further concentrate of the amino acids. Elimination of the excess acid is carried out by concentration to a syrup and vacuum drying in the presence of a suitable base as, for example, in the presence of an alkali metal hydroxide such as sodium hydroxide, and dissolving the residue in water and filtering off any residue of humin and insoluble polymers.

The filtrate obtained according to the foregoing procedure is then treated with an ion-exchange resin such as a sulfonic acid resin whereby substantially all of the deuterated L-amino acids are adsorbed and the non-amino acid components and any remaining acid are effectively eliminated. The adsorbed L-amino acids are then recovered by elution as, for example, by treatment with a suitably concentrated solution of ammonium hydroxide followed by the filtration of the concentrate in water and decolorization with charcoal, whereafter, the resulting mixture is filtered a second time and then concentrated and lyophilized to afford a mixture of the L-amino acids in deuterated form. The deuterated L-amino acid mixture thus obtained is then subjected ti either of several separation techniques to afford the desired partially deuterated starting material.

According to one such separation procedure the deuterated L-amino acid mixture obtained according to the foregoing method is adsorbed on an ion-exchange resin and the individual L-amino acids are eluted by automatically collecting the effluent while, at the same time, a very minimal quantity as, for example, one-six-hundredth of the effluent, is diverted to an amino acid automatic analyzer whereby the eluted amino acid is automatically monitored. The apparatus, buffer solution and method employed are as follows:

A column is charged with a cation exchange resin as, for example, with a polystyrene sulfonic acid ($H^+$) cation exchange resin of about 200 to 400 mesh such as BIORAD AG–50W–X8 (400 mesh) $H^+$ form resin. The column tubing, which contains a water jacket, consists of pressure and stainless steel couplings and connectors. The top of the column is provided with a three-way tap to allow for addition of the buffer following the addition of the sample and the bottom of the column is provided with a stream splitter so that the major portion of effluent is directed to an automatic fraction collector while a minute portion is diverted to an automatic analyzing system. The column is of such size that an initial charge of 5–10 g. of mixture of amino acids can be separated. A small portion of the effluent solution is continuously monitored via reaction with an ninhydrin reagent, i.e., an automatic analyzing system which is equipped to maximize the sensitivity of the ninhydrin response. The buffer solutions which are employed in the extraction of labelled L-amino acid are in general, volatilizable basic solutions having a pH in the range of from about 3.0 to 5.0. Suitable buffers include, for example, pyridinium formate and pyridinium acetate which, under the conditions of the reaction, are easily vaporized and serve to increase slightly the basicity of the reaction mixture so as to make possible the separation of the individually labelled products. Cuts of 25 ml. each are taken with a fraction collector and appropriate cuts are pooled, concentrated in vacuo to dryness and excess acetic acid and pyridine is removed by concentrating two additional times with water. Partially deuterated L-aspartic acid (III), L-glutamic acid (III) and L-tyrosine (II) are collected and the recovered L-amino acids are identified by thin-layer silica gel chromatography using conventional systems and standards.

An alternate method for the separation of the partially deuterated L-tyrosine starting material (II) consists in treating the deuterated amino acid mixture obtained according to the aforementioned process with an aqueous solution of an acid as, for example, with a mineral acid such as hydrochloric acid, maintained at a PH of about 5.0 to 6.0 followed by successive washings with suitable eluants such as water, ethanol, ethyl ether and the like. The partially deuterated L-tyrosine-$\alpha,\beta,\beta,2,6$-$d_5$ (II) thus obtained is in a purity suitable for use directly in the process of this invention.

The following examples illustrate the process of this invention. However, the examples are illustrative only and any modification thereof which results in the formation of an identical product should be construed as an analogous and functionally equivalent method of preparation.

EXAMPLE 1

L-Tyrsoine-Carboxy,N,N,3,4,5-$d_6$

L-Tyrosine (1.0 g.) is heated under nitrogen in 6 N deuterium chloride (5 ml.) at 110° C. for 20 hours. The deuterium chloride and deuterium oxide are then removed by concentration in vacuo and excess deuterium chloride is removed by repeating the concentration in vacuo with additional water flushes. The resulting solution of deuterated L-tyrosine is diluted to 50 ml., filtered and the filtrate adjusted to pH 5.5 with the dropwise addition of 5 percent sodium hydroxide whereupon the partially deuterated L-tyrosine separates out in the form of crystals. The partially deuterated L-tyrosine is kept at 5° C. overnight, whereafter, the said product is removed by filtration, washed successively with two 5 ml. portions of water, two 5 ml. portions of ethanol, two 5 ml. portions of ethyl ether and dried in vacuo at 50° C. to afford 900 mg. of L-tyrosine-carboxy,N,N,3,4,5-$d_6$.

EXAMPLE 2

L-Tyrosine-$d_{11}$

Step A: Preparation of Deuterated L-Amino Acid Mixture

1. Cell Rupture and Chlorophyll Removal

Lyophilized deuterated algae (250 g.) is extracted with three 3,500 ml. portions of 10 percent trichloroacetic acid at 70° C. with agitation for 30 minutes. Upon cooling at room temperature the algae residue is recovered by centrifugation at 5,000–10,000 g. for 10 minutes at 5°–10° C. The crude protein residue is then agitated with 4.0 liters of 2:2:1 ethanol-ethyl ether mixture and filtered on a large sintered glass funnel of medium porosity. The residue is washed again with two 4-liter portions of solvent followed by washing with five 1-liter portions of ethyl ether. The residue is then dried in vacuo at 30° C. to afford 130.0 g. of partially purified protein.

2. Hydrolysis

The purified protein (126.5 g.) obtained according to Step A (1) is hydrolyzed in a sealed glass bomb by treatment with 1,800 ml. of 6 N hydrochloric acid for 16 hours at 110° C. The hydrolysis mixture is saturated with a few drops of capryl alcohol to control foaming and is then cooled to room temperature and filtered through a sintered glass funnel. The residue thus obtained is washed with three 250 ml. portions of distilled water to afford a mixture of amino acids containing an excess of hydrochloric acid. The residue is discarded and the filtrate consisting of amino acids and excess hydrochloric acid is concentrated in vacuo at about 35° C. to afford a syrup and capryl alcohol is added to control foaming. The mixture is then redissolved in 500 ml. of water and reconcentrated in vacuo at about 35° C. to a syrup. The flushing with water is repeated two additional times in order to remove most of the free hydrochloric acid and the syrup is then dried in a vacuum oven containing a tray of sodium hydroxide pellets at a temperature of about 50° C. for 16 hours in order to remove the last traces of free hydrochloric acid. It is critical to remove the last traces of hydrochloric acid in order to obtain good adsorbtion on the resin column. The syrup is dissolved in 2.0 liters of water and filtrered through a sintered glass funnel to afford a filtrate comprising the amino acids and their hydrochloride salts and soluble impurities. The volume is adjusted to 3.0 liters.

3. Resin Adsorbtion

An 8.5 cm. diameter/80 cm. column (4.0 liters) is filled with a sulfonic acid ion exchange resin 8 percent cross linked (e.g., Dowex 50–X8 resin) and converted to the hydrogen cycle. The resin is pretreated with 20 liters of 1.5 percent ammonium hydroxide solution followed by the addition of 20 liters of water, whereafter 20 liters of 10 percent hydrochloric acid solution is added to the mixture. The column is washed with distilled water at a rate of 175 ml. per minute until free of chloride ion. The filtered hydrolysis solution obtained in Step A (2) containing the amino acid and their hydrochloride salts and soluble impurities is passed through the column (60 ml. per minute) and washed with water until a volume of 12 liters is collected. The column is then eluted with a 6 N ammonium hydroxide solution. A void of 3,500 ml. is discarded and ten liters of eluate are collected. In the mixture thus obtained 90 percent of the amino acids are present in the first two liters of eluate. The entire collection of eluates is concentrated in vacuo at about 35° C. to 500 ml. and lyophilized to yield 81.3 gm. of a mixture of deuterated L-amino acids.

4. Deuterated L-Amino Acid Mixture

The mixture of deuterated L-amino acids obtained according to Step A (3) is dissolved in 1.5 liters of distilled water and decolorized with an equal weight of decolorizing carbon and stirred for one-half hour at room temperature. The slurry is filtered over a thin layer of diatomaceous earth and washed with two 500 ml. portions of water. The filtrate and washes are then concentrated in vacuo to 500 ml. and lyophilized to afford 72 g. of a white purified mixture of deuterated L-amino acids. The yield of deuterated L-amino acid mixture per 100 g. of deuterated algae cells is 29.2 percent; purity: 101.00 percent; moisture content: 7.11 percent.

Step B: L-Tyrosine-$\alpha,\beta,\beta2,6$-$d_5$ and L-Tyrosine-Carboxy-N,N,$\alpha,\beta,\beta,2,4,6$-$d_9$ To a column charged with a sulfonic acid ion exchange resin [Biorad AG –50W–X8 (400 mesh) H$^+$ form] is added the deuterated L-amino acid mixture (7.0 g.) obtained according to Step A in water (30 ml.) and adjusted to a pH of 2.2 with 6 N hydrochloric acid. The deuterated L-amino acid mixture obtained according to Step A is fed to the column at a rate of 2.2 ml./minute and developed with a series of buffers beginning with a 0.1 M pH 3.1 pyridinium formate buffer. Cuts of 25 ml. each are taken with a fraction collector and appropriate cuts are pooled, concentrated in vacuo to dryness and excess acetic acid an pyridine is removed by concentrating two additional times with water.

At the end of cut 510 a 0.2 M pH 3.1 pyridinium formate buffer is fed to the column and 100 ml. cuts are collected thereafter. At the end of cut 603 a 0.2 M pH 4.4 pyridinium acetate buffer is fed to the column. Partially deuterated L-tyrosine (90 mg.), i.e., L-tyrosine-carboxy-N,N,$\alpha,\beta,\beta$,2,4,6-$d_9$, in which all hydrogen atoms except those bonded to the carbons ortho to the hydroxy moiety are replaced by deuterium, is collected over cuts 692–698. The readily exchangeable nature of the deuterium atoms bonded to the carbonyloxy, hydroxy and amino moieties in aqueous solution resluts in an isolation of the said partially deuterated L-tyrosine as L-tyrosine-$\alpha,\beta,\beta$,2,6-$d_5$. Nuclear magnetic resonance spectroscopy shows the L-tyrosine-$\alpha,\beta,\beta$,2,6-$d_5$ to be 98 percent deutero pure.

Step C: L-Tyrosine-$d_{11}$

The L-tyrosine-$\alpha,\beta,\beta$,2,6-$d_5$ (41 mg.) obtained according to Step B is heated at 110° C. with 6 N deuterium chloride (1 ml.). There is thus obtained a substantially quantitative amount of totally deuterated L-tyrosine, namely, L-tyrosine-$d_{11}$. Nuclear magnetic resonance spectroscopy indicates that the entire L-tyrosine molecule is deuterated.

EXAMPLE 3

L-Tyrosine-$d_{11}$

Step A: L-Tyrosine-$\alpha,\beta,\beta$,2,6-$d_5$

The mixture of partially deuterated L-amino acids (5.0 g.) obtained according to Example 2, Step A, is dissolved in water (20 ml.) and the pH adjusted to 5.5 with hydrochloric acid to precipitate partially deuterated L-tyrosine. The solution is stirred for 1 hour at 5° C., filtered and the precipitate washed successively with two 5 ml. portions of water, two 5 ml. portions of ethanol and two 5 ml. portions of ether. Upon drying the precipitate in vacuo at 60° C. there is thus obtained 45 mg. of partially deuterated L-tyrosine, i.e., L-tyrosine-$\alpha,\beta,\beta$,2,6-$d_5$, in which the carbon atoms ortho to the hydroxy radical are substituted by hydrogen. Thin-layer chromatography on silica gel indicates an L-amino acid purity of more than 95 percent L-tyrosine-$\alpha, \beta, \beta$, 2,6-$d_5$ partially deuterated L-tyrosine.

Step B: L-Tyrosine-$d_{11}$

The L-tyrosine-$\alpha,\beta,\beta$,2,6-$d_5$ (50 mg.) obtained according to Step A is heated at 110° C. with 6 N deuterium chloride (1 ml.). There is thus obtained a substantially quantitative amount of totally deuterated L-tyrosine, i.e., L-tyrosine-$d_{11}$. Nuclear magnetic resonance spectroscopy confirms that the entire L-tyrosine molecule is deuterated.

EXAMPLE 4

L-Tyrosine-Carboxy,N,N,3,4,5-$d_6$

Protonated L-tyrosine (10 mg.) is heated at 110° C. for 20 hours in 0.25 N sodium deuteroxide (0.5 ml.) under a nitrogen atmosphere. Nuclear magnetic resonance spectroscopy indicates that the product thus obtained is L-tyrosine-carboxy,N,N,3,4,5-$d_6$.

EXAMPLE 5

L-Glutamic-N,N,4,4-$d_4$ acid-$d_2$

Protonated L-glutamic acid (10 mg.) is heated in 6 N deuterium chloride (0.5 ml.) at 115° C. for 20 hours under a nitrogen atmosphere. Nuclear magnetic resonance spectroscopy indicates that specific deuteration occurs on the gamma-carbon of glutamic acid to afford L-glutamic-N,N,4,4-$d_4$ acid-$d_2$.

EXAMPLE 6

L-Aspartic-N,N,3,3-$d_4$ acid-$d_2$

By substituting protonated L-aspartic acid (10 mg.) for the protonated L-glutamic acid reactant of Example 5 and other wise following the procedure described therein there is thus obtained L-aspartic-N,N,3,3-$d_4$ acid-$d_2$.

EXAMPLE 7

DL-Aspartic-N,N,3,3-$d_4$ acid-$d_2$

Protonated DL-aspartic acid (10 mg.) is heated at 115° C. for 15 hours in 0.25 N potassium deuteroxide (0.5 ml.) under an atmosphere of nitrogen. There is thus obtained DL-aspartic-N,N,3,3,-$d_4$ acid-$d_2$.

By substituting protonated DL-tyrosine and protonated DL-glutamic acid for DL-aspartic acid recited in the preceding paragraph and following the procedure described therein there is thus obtained DL-tyrosine-carboxy,N,N,3,4,5-$d_6$ and DL-glutamic-N,N,4,4-$d_4$ acid-$d_2$.

EXAMPLE 8

L-Aspartic Acid-$d_7$

Step A: L-Aspartic-2-d acid

To a column charged with a sulfonic acid ion exchange resin [Biorad AG–50W–X8 (400 mesh) H$^+$ form] is added the deuterated L-amino acid mixture (7.0 g.) obtained according to Example 1, Step A, in water (30 ml.) and adjusted to a pH of 2.2 with 6 N hydrochloric acid. The deuterated L-amino acid mixture is fed to the column at a rate of 2.2 ml./minute and developed with a series of buffers beginning with a 0.1 M pH 3.1 pyridinium formate buffer. Cuts of 25 ml. each are taken with a fraction collector and appropriate cuts are pooled, concentrated in vacuo to dryness and excess acetic acid and pyridine is removed by concentrating two additional times with water. Partially deuterated L-aspartic acid (126 mg.), i.e., L-aspartic-2-d acid, is collected over cuts 156–183. Nuclear magnetic resonance spectroscopy shows the L-aspartic-2-d acid to be 95 percent deutero pure.

Step B: L-Aspartic Acid-$d_7$

By substituting the L-aspartic-2-d acid obtained according to Step A for the L-tyrosine-$\alpha,\beta,\beta$,2,6-$d_5$ reactant recited in Example 2, Step C, and following substantially the procedure described therein there is thus obtained L-aspartic acid-$d_7$.

EXAMPLE 9

L-Aspartic-N,N,2-$d_3$ acid-$d_2$

L-Aspartic acid-$d_7$ (10 mg.) in 6 N hydrochloric acid (0.5 ml.) is heated at 115° C. for 20 hours under nitrogen. There is thus obtained L-aspartic-2-d acid, the structure of which is confirmed by nuclear magnetic resonance spectroscopy. Treatment of the L-aspartic-2d acid with deuterium oxide results in an exchange of the protons bonded to the amino and carboxy moieties by deuterium to afford L-aspartic-N,N,2-$d_3$ acid-$d_2$.

Upon substituting L-glutamic acid-$d_9$ for the L-aspartic acid-$d_7$ recited in the preceding paragraph and treating with a 6 N solution of hydrochloric acid there is obtained L-glutamic-2,3,3-$d_3$ acid which, upon treatment with deuterium oxide, results in the formation of L-glutamic-N,N,2,3,3-$d_5$ acid-$d_2$.

We claim:

1. Deuterated DL- or L-tyrosine having the structure

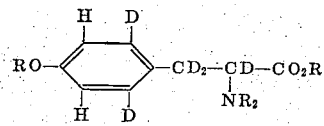

or

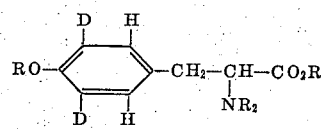

wherein R is hydrogen or deuterium.

2. A compound according to claim 1 wherein the deuterated product is L-tyrosine having the structure:

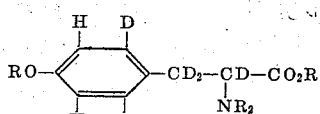

wherein R is hydrogen or deuterium.

3. A compound according to claim 2 wherein the deuterated product is L-tyrosine-$\alpha,\beta,\beta,2,6$-$d_5$.

4. A compound according to claim 1 wherein the deuterated product is L-tyrosine having the structure

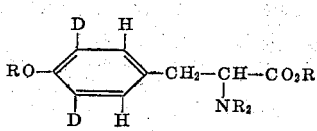

wherein R is hydrogen or deuterium.

5. A compound according to claim 4 wherein the deuterated product is L-tyrosine-carboxy,N,N,3,4,5-$d_6$.

6. A method for effecting an exchange of at least the X-hydrogen atoms in the L- or DL-products having structures I or II below

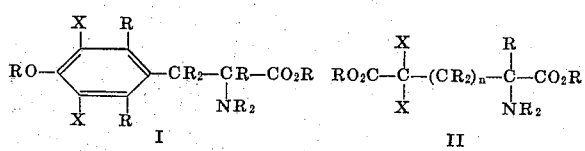

by the reaction of said product I or product II with a deuterated inorganic acid or a deuterated metal hydroxide thus providing a product having structure III (from compound I) or structure IV (from Compound II)

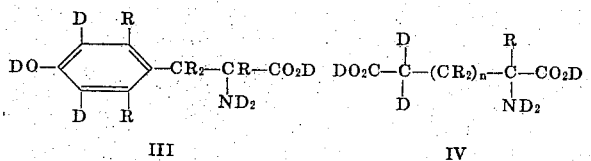

wherein in each of the foregoing structures X represents hydrogen, R represents hydrogen or deuterium and $n$ represents 0 or the numeral 1.

7. The method according to claim 6 wherein the deuterated inorganic acid is a deuterated mineral acid.

8. The method of claim 6 wherein the deuterated metal hydroxide is an alkali metal alkoxide deuteroxide or alkaline earth metal deuteroxide.

9. The method according to claim 7 wherein the deuterated mineral acid is employed in a concentration of from about 1 N to 7 N.

10. The method according to claim 8 wherein the alkali metal deuteroxide or alkaline earth metal deuteroxide is employed in a concentration of from about 0.1 N to about 1.0 N.

11. The method according to claim 6 wherein the process is conducted at the reflux temperature of the reaction mixture.

12. A method according to claim 6 for the preparation of selectively deuterated DL- or L-products having structure III-a or IV-a below

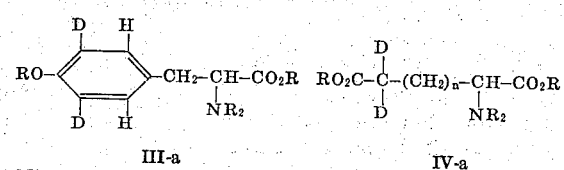

wherein R is hydrogen or deuterium and $n$ represents 0 or the numeral 1, which comprises treating L-tyrosine to give III-a, L-aspartic acid or L-glutamic acid to give IV-a with a deuterated mineral acid or an alkali metal deuteroxide or an alkaline earth metal deuteroxide.

13. The method according to claim 12 for the preparation of L-tyrosine-carboxy-N,N,3,4,5-$d_6$, which comprises treating L-tyrosine with deuterium chloride at a temperature in the range of from about 80°–120° C.

14. The method according to claim 12 for the preparation of L-aspartic-N,N,3,3-$d_4$ acid-$d_2$, which comprises treating L-aspartic acid with deuterium chloride at a temperature in the range of from about 80°–120°.

15. A method according to claim 12 for the preparation of DL-aspartic-N,N,3,3-$d_4$ acid-$d_2$, which comprises treating DL-aspartic acid with potassium deuteroxide at a temperature in the range of from about 80°–110° C.

16. The method according to claim 12 for the preparation of L-glutamic-N,N,4,4-$d_4$ acid-$d_2$, which comprises treating L-glutamic acid with deuterium chloride at a temperature in the range of from about 80°–120° C.

17. A method according to claim 6 for the preparation of totally deuterated L-tyrosine, totally deuterated L-aspartic acid and totally deuterated L-glutamic acid, which comprises treating L-tyrosine-$\alpha,\beta,\beta,2,6$-$d_5$, L-aspartic-2-d acid or L-glutamic-2,3,3-$d_3$ acid with a deuterated mineral acid or an alkali metal deuteroxide or alkaline earth metal deuteroxide.

18. The method according to claim 17 for the preparation of L-tyrosine-$d_{11}$, which comprises treating L-tyrosine-$\alpha,\beta,\beta,2,6$-$d_5$ with deuterium chloride at a temperature in the range of from about 80°–120° C.

19. The method according to claim 17 for the preparation of L-aspartic acid-$d_7$, which comprises treating L-aspartic-2-d acid with deuterium halide at a temperature in the range of from about 80°–120° C.

20. A method for the preparation of L-aspartic-N,N,2-$d_3$ acid-$d_2$ and L-glutamic-N,N,2,3,3-$d_5$ acid-$d_2$, which comprises treating L-aspartic acid-$d_7$ or L-glutamic acid-$d_9$ with a concentrated solution of an acid at a temperature in the range of from about 90°–150° C. followed by the treatment of the L-aspartic-2d acid or L-glutamic-2,3,3-$d_3$ acid intermediate thus obtained with deuterium oxide to afford the desired product.

21. The method according to claim 20 wherein the L-aspartic acid-$d_7$ or L-glutamic acid-$d_9$ is treated with mineral acid at a temperature in the range of from about 110°–120° C.

22. The method according to claim 20 for the preparation of L-aspartic-N,N,2-$d_3$ acid-$d_2$, which comprises treating L-aspartic acid-$d_7$ with 6 N hydrochloric acid at a temperature of 115° C. to afford L-aspartic-2-d acid which, upon treatment with deuterium oxide, affords the desired product.

23. The method according to claim 20 for the preparation of L-glutamic-N,N,2,3,3-$d_5$ acid-$d_2$, which comprises treating L-glutamic acid-$d_9$ with 6 N hydrochloric acid at 115° C. to afford L-glutamic-2,3,3-$d_3$ acid which, upon treatment with deuterium oxide, affords the desired product.

24. A method for effecting exchange of at least the X-hydrogens or L- or DL-tyrosine having the structure

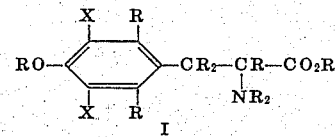

which comprises the reaction of compound I with a deuterated inorganic acid or a deuterated metal hydroxide thus providing a product having the structure

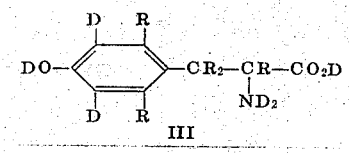

wherein in each of the foregoing structures X represents hydrogen and R represents hydrogen or deuterium.

25. A method for effecting exchange of at least the X-hydrogen atoms in an L- or DL-compound having the structure

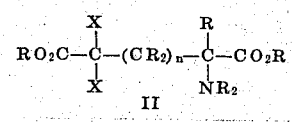

which comprises the reaction of compound II with a deuterated inorganic acid or a deuterated metal hydroxide thus providing a product having the structure

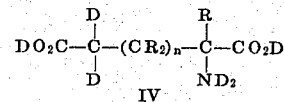

wherein in each of the foregoing structures X represents hydrogen, R represents hydrogen or deuterium, and $n$ represents 0 or the numeral 1.

* * * * *